United States Patent [19]

Motohashi et al.

[11] Patent Number: 4,978,237
[45] Date of Patent: Dec. 18, 1990

[54] CAGE STRUCTURE OF ROLLER BEARING

[75] Inventors: Nobutsuna Motohashi; Fukumitsu Kitauchi; Nobuyuki Miyawaki, all of Osaka, Japan

[73] Assignee: Koyo Seiko Co., Japan

[21] Appl. No.: 352,279

[22] Filed: May 16, 1989

[30] Foreign Application Priority Data

May 16, 1988 [JP] Japan ............................ 63-64741[U]

[51] Int. Cl.$^5$ ........................ F16C 33/46; F16C 33/54
[52] U.S. Cl. ................ 384/580; 29/898.067; 384/572
[58] Field of Search .............. 384/572, 580, 533; 29/148.4 C

[56] References Cited

U.S. PATENT DOCUMENTS

| 1,668,112 | 5/1928 | Gibbons | 384/580 |
| 2,848,791 | 8/1958 | Neese | 384/572 |
| 3,110,529 | 11/1963 | Schaeffler | 384/580 |
| 3,582,165 | 6/1971 | Koch | 384/580 |
| 4,797,015 | 1/1989 | Hidano et al. | 384/580 |

Primary Examiner—Thomas R. Hannon

[57] ABSTRACT

A cage of a roller bearing including a plurality of pockets formed by punching from the outside, each storing a roller, in the circumferential direction of a barrel, which comprises a first projection for preventing the roller from being disassembled to the outside of the barrel and a second projection for preventing the roller from being disassembled to the inside of the barrel. The first projection is provided at a thin portion of the barrel which is formed between the brims of the pocket. The second projection is provided at a thick portion of the barrel in the axial direction by knurling.

4 Claims, 5 Drawing Sheets

PRIOR ART

CAGE STRUCTURE OF ROLLER BEARING

BACKGROUND OF THE INVENTION

The present invention relates to a cage for a roller bearing and, more particularly, to a cage for a needle roller bearing which is suitable for an internal combustion engine.

FIG. 8 shows a conventional cage B of a roller bearing comprising a plurality of rollers. Annular circumferential grooves $B_1$ are formed at the center of the cage B manufactured by machining a pipe or a bar. Several roller-storage pockets $B_2$ are punched out. The punched-out pockets $B_2$ are broached and then inner faces $B_3$ of the pockets $B_2$ and inner sides of separating portions $B_4$ are finished. In the above-described cage B of FIG. 8, to facilitate its assembling operation, the cage B has such a structure that the rollers aren't disassembled when being handled. Projections $B_6$ inwardly projected to the pockets $B_2$ are disposed at a thin portion $B_5$ in the axial middle of the separating portion $B_4$. Further, small projections $B_8$ inwardly projected to the pockets $B_2$ are formed at a thick portion $B_7$ of the separating portion $B_4$ by knurling.

There is, however the following disadvantage in the conventional cage B of FIG. 8. In the inner faces $B_3$ of the punched pocket $B_2$, a sheared face the surface of which is generally smooth is formed and, successively, in the direction of punching, namely, from the radial outer side to the radial inner side and, successively, a breaking face the surface of which is generally rough is formed. That is, according to the construction of the cage B for a roller bearing, the projections $B_6$ provided at the thin portion $B_5$ for preventing the rollers from being disassembled in the inner radial direction are formed by breaking during punching. Accordingly, the face conditions of the projections $B_6$ become rougher than those of the sheared face. High accuracy can not be expected of a clearance $l_2$ between the opposing projections $B_6$ within the pocket.

Therefore, the faces of the projections $B_6$ formed by breaking must be smoothly finished. For this purpose, many processing steps are needed for forming the roller-storage pocket $B_2$, resulting in high working cost and poor mass-production.

SUMMARY OF THE INVENTION

Accordingly, it is an object of the present invention to provide an improved cage structure for a roller bearing ensuring the accuracy of the faces of the projections for preventing rollers from being disassembled and the accuracy of the clearance between the projections, by simplified manufacturing steps.

Briefly described, in accordance with the present invention, a roller bearing cage including a plurality of pockets formed by punching from the outside, each pocket storing a roller, between barrels, which comprises a first projection for preventing the roller from being disassembled outwardly, the first projection being provided at a thin portion of the barrel which is formed between the brims of the pocket, and a second projection for preventing the roller from being disassembled inwardly, the second projection being provided at a thick portion of the cylindrical shaped barrel in an axial direction by knurling.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENT

Figure 1:
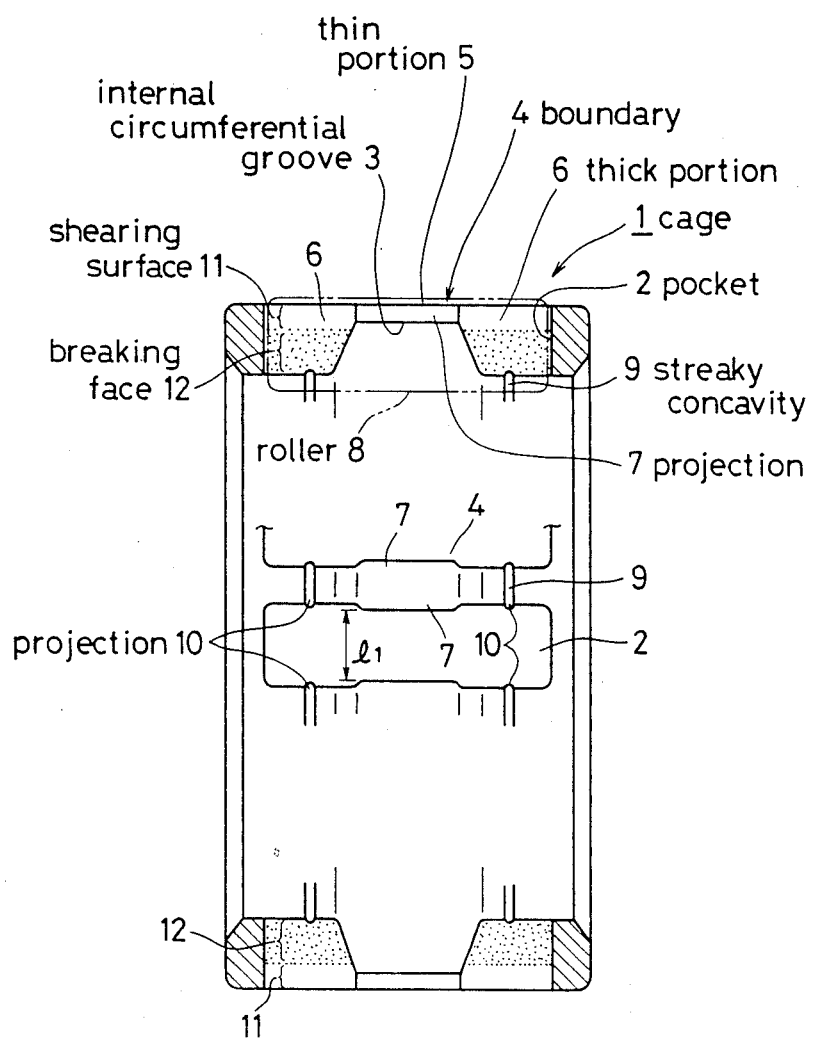
FIG. 1 is a cross-sectional view of the essential parts of a cage of a roller bearing according to a preferred embodiment of the present invention.
Figure 2:
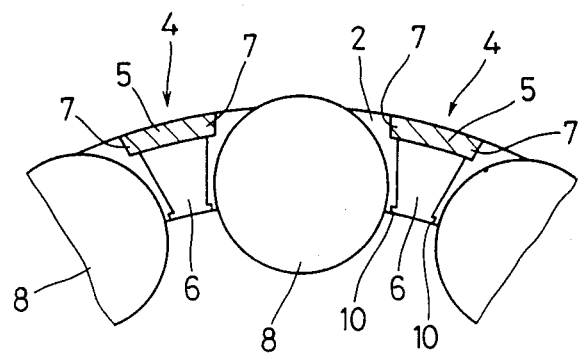
FIG. 2 is a partial sectional view of the cage storing a roller.
Figure 3:
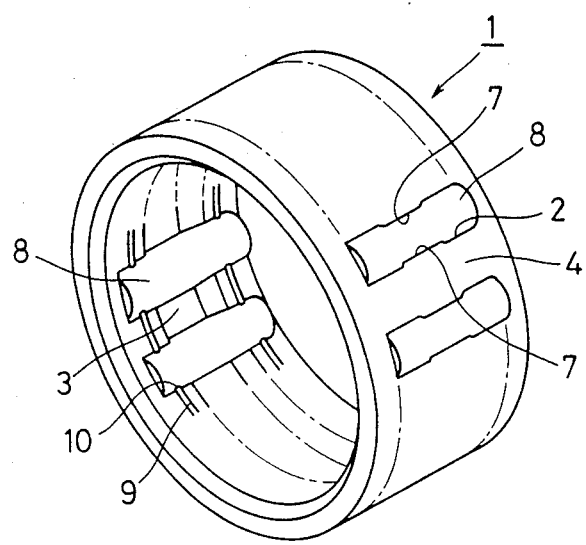
FIG. 3 is a perspective view of the cage of the roller bearing.

FIGS. 1 through 5 show a cage of a roller bearing according to a preferred embodiment of the present invention. Referring to these drawings, a cage 1 of a roller bearing comprises a pocket 2 for storing a roller 8, an annular internal circumferential groove 3 having a certain width formed at the axial-directional center of the cage 1, and a bar 4 between the adjacent pockets 2. The radial-directional width of the bar 4 at the axial-directional center corresponding to the position of the internal circumferential groove 3 is thinner than the remaining portions of the bar 4. The thin portion provided at an outer-most location and central section of each of the bars between adjacent pockets is designated by numeral 5 while the thick portion at both sides of the pin portion 5 is designated by numeral 6.

A projection 7 is provided on the thin portion 5. The projection 7 projects slightly inwardly to the inner side of the pocket 2, from the side of the thick portion 6 at the bar 4. The projections are disposed opposite to each other in the circumferential direction at the thin portion and the distance between the projections of the opening is smaller than the diameter of the roller. The projection 7 functions to prevent the roller 8 from being disassembled to the outside in the radial-direction.

A streaky concavity 9 is provided circumferentially at the inner side of the thick portion 6.

Another projection 10 is provided at the opening edge of the streaky concavity 9. The projection 10 projects slightly inwardly to the inner side of the pocket 2, from the side of the bar 4. The streaky concavity 9 and the projection 10 both are formed by knurling.

The projection 10 functions to prevent the roller 8 from being disassembled to the inner side in the radial-direction.

About one third of the outer portion of the side face of the thick portion 6 at the bar 4 and the side face of the projection 10 at the thin portion 5, at the inner side of the pocket 2, is formed by shearing, whereas, the remaining approximately two thirds at the inner portion is formed by breaking. The surface formed by shearing is designated by numeral 11 while the surface formed by breaking is designated by 12 (In FIG. 1, it is shown as spots). The surface 12 formed by breaking is not as smooth as the surface 11 formed by shearing, which is smooth. The rough surface 12 formed by breaking makes it easier to keep a lubricant within the bearing.

Figure 4:
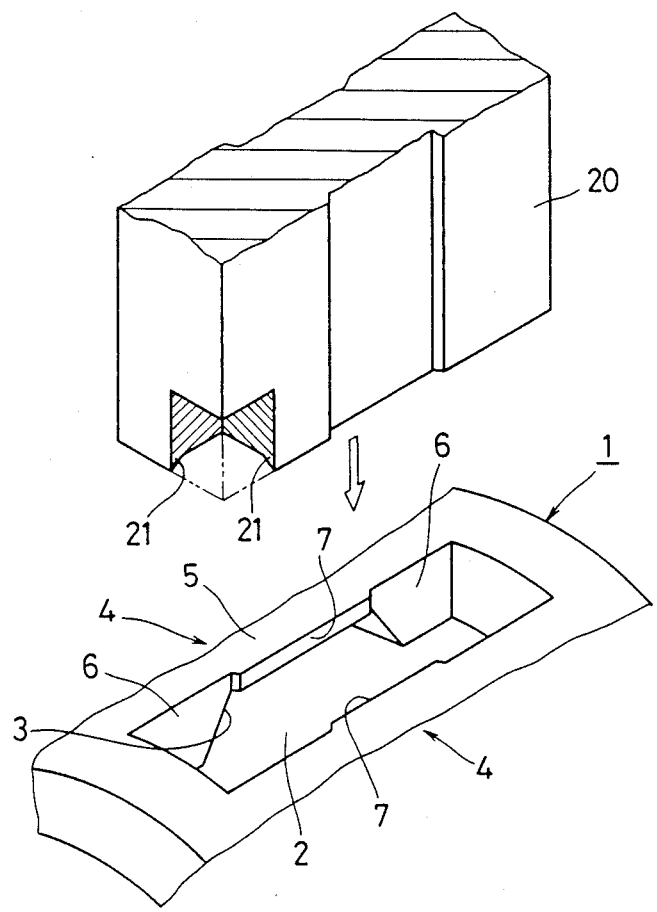
FIG. 4 is a perspective view of a punch for forming a pocket in the cage.

To make the pockets 2 in the cage 1 of the roller bearing, a puncher, as shown in FIG. 4, is used. The pockets 2 are formed by punching selected circumferential portions of a cylindrical mother material forming the inner circumferential groove, from the outer radial-directional side to the inner radial-directional side, as designated by the arrow in FIG. 4, so that a plurality of pockets 2 are formed.

Figure 5:
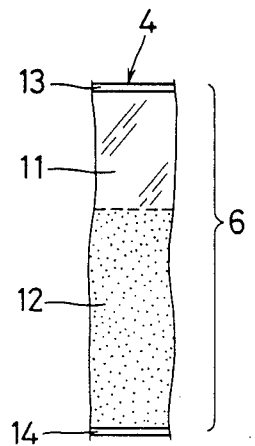
FIG. 5 is a shematic illustration of the inner surface of the pocket after punching.

Referring in detail to the inner face of the punched pocket 2, there are provided in turn a start edge 13 at the opening edge of the outer side of the pocket 2, the sheared face 11 on about one third of the radial-directional thickness by a point 21 of a sword of the puncher 20, the broken face 12 or about two-thirds of the radial-directional thickness, and finally a rear edge 14 at the opening edge of the inner side of the pocket 2, as shown in FIG. 5.

The arrangement of the cage 1 of the roller bearing according to the present invention is determined, as described above, in view of the conditions of the punched surface formed by punching. That is, the projection 7 is provided in the cage 1 of the roller bearing of the present invention for preventing the rollers from being disassembled outwardly in the radial direction.

The projection 7 is disposed at the outer side from the sheared face formed by punching, such that the face condition of the projection 7 is smooth, and any finishing operations for its face as required in the conventional case are eliminated. The roller guide surfaces of each of the bars has sheared surfaces at a radially outer side and broken surfaces at a radially inner side.

Therefore, according to the preferred embodiment of the present invention, fewer processing steps are required to make the pocket 2 than in the conventional case. Nevertheless, the surface accuracy of the projection 10 at the pocket 2 and the required accuracy of a gap $l_1$ between the projections 7 can be stably acquired. Since the face 12 formed by breaking during punching can function to keep a lubricant within the bearing, supply of a lubricant to the sliding portions during high speed rotation of the roller bearing can become less than in the conventional cage structure.

Figure 6:
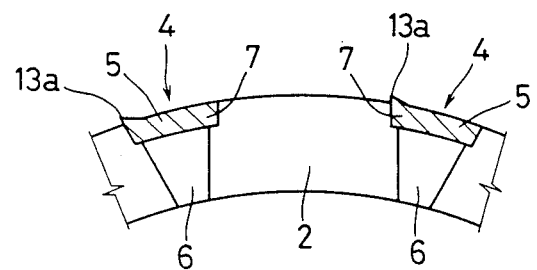
FIG. 6 is a cross sectional view of an opening brim at the outer side of the pocket before a bur is removed.
Figure 7:
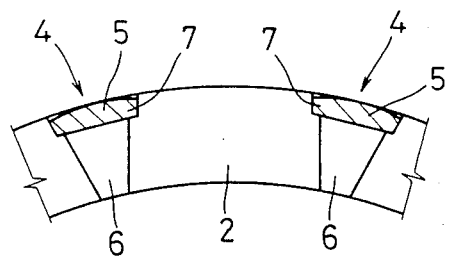
FIG. 7 is a cross sectional view of an opening brim at the outer side of the pocket after a bur is removed.
Figure 8:
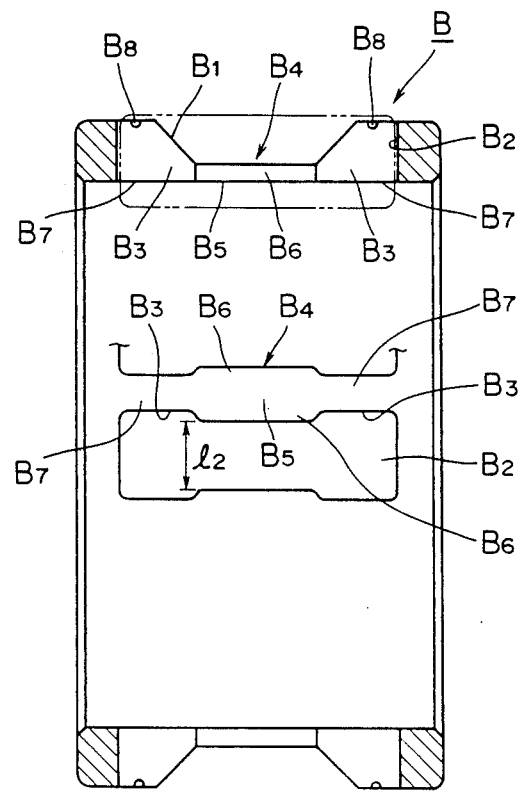
FIG. 8 is a cross sectional view of the conventional cage of a roller bearing.

When the puncher 20 is removed, after punching the pocket 2, normally the start edge 13 formed at the outer opening edge of the pocket 2 may be forced to the outside by the puncher 20, resulting in a burr 13a, as shown in FIG. 6. The burr 13a can be removed by a normal burr-removing operation. According to the present invention, to remove the burr 13a, the outer face of the bar 4 is finished so as to be rounded in the circumferential direction, as shown in FIG. 7. As compared with the conventional case in which the burr 13a is simply removed, the cage 1 of the roller bearing having the bar 4 in the shape of FIG. 7 can reduce torque loss of the face 1 during rotation because the edge at the opening of the pocket 2 does not take off the lubricant so much.

As described above, in accordance with the present invention, pockets for storing rollers are punched by a puncher. At the inner side of the pocket, there is provided the outer portions inclusive of the thin portion, preferably, the thick portion at both sides of the thin portion, the outer portions being sheared by the point of the sword of the punch, while the inner portions are broken, successive to the outer portions, by the same point.

Since the outer portions inclusive of the thin portion at the inner face of the pocket are formed by shearing, the projection for preventing the roller from being disassembled does not need to be finished, the projection being provided at the thin portion. The projection is smooth enough as such. In addition, the accuracy of the gap between the adjacent projections can be assured. While the inner portions broken by the puncher remain, the rough surface of the inner portions can keep a lubricant within the bearing. This can contribute to extending the cycle of supplying a lubricant to sliding portions, in particular, during high-speed rotation of the bearing.

While only certain embodiments of the present invention have been described, it will be apparent to those skilled in the art that various changes and modifications may be made therein without departing from the spirit and scope of the present invention as claimed.

What is claimed:

1. A cage of a roller bearing including a plurality of pockets formed by punching from the outside in a circumferential direction of a barrel, each pocket storing a roller, comprising:
    a first projection for preventing the roller from being disassembled to the outside of the barrel, said first projection being provided at a thin portion of said barrel which is positioned beside the brims of each pocket; and
    a second projection for preventing the roller from being disassembled to the inside of said barrel, said second projection being provided at a thick portion of said barrel in an axial direction, by knurling.

2. The cage as set forth in claim 1, wherein a boundary between adjacent pockets is rounded in shape.

3. A cage of a roller bearing including a plurality of pockets formed by punching from the outside, each pocket for storing a roller, in the circumferential direction of a cylindrical shaped barrel, comprising;
    a thin portion provided at an outermost location and a central section of a plurality of bars between adjacent pockets, and
    a pair of projections oppositely disposed in the circumferential direction at said thin portion, the distance between said oppositely disposed projections of an opening therebetween being smaller than a diameter of said roller;
    roller guide surfaces of each of said bars having sheared surfaces at a radially outer side and broken surfaces at a radially inner side.

4. The cage as set forth in claim 3, wherein each of said bars between adjacent pockets being shaped round in the transverse cross section.

* * * * *